Feb. 22, 1966  W. F. ALLINGHAM  3,236,252
MANIFOLD GAS VALVE
Filed May 24, 1962  3 Sheets-Sheet 1

INVENTOR.
WALTER F. ALLINGHAM
BY
Alan M. Staubly
ATTORNEY

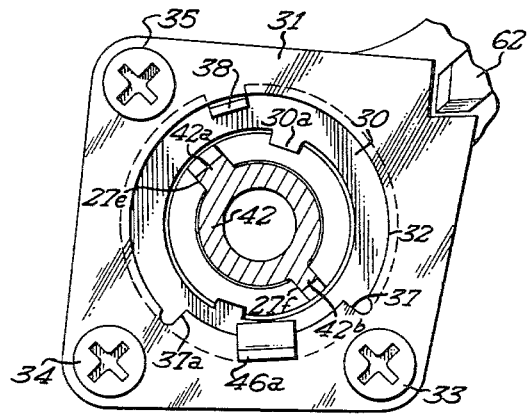
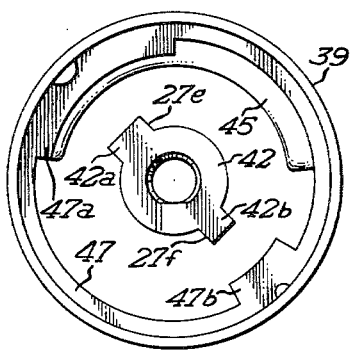
Fig 4    Fig 5
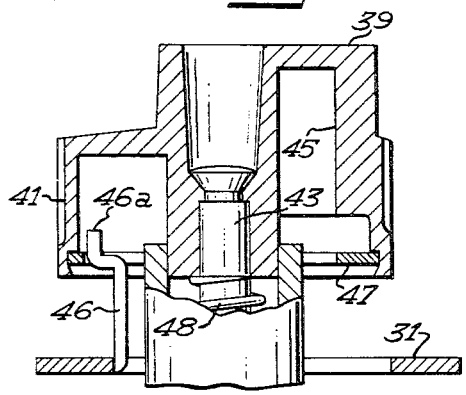
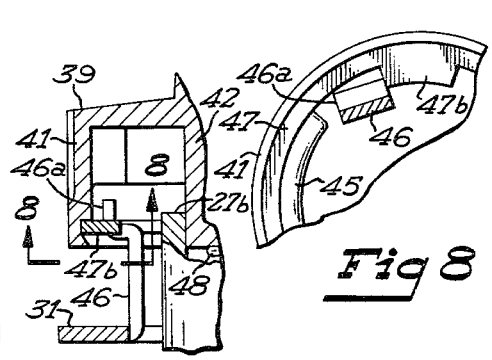
Fig 6    Fig 7    Fig 8
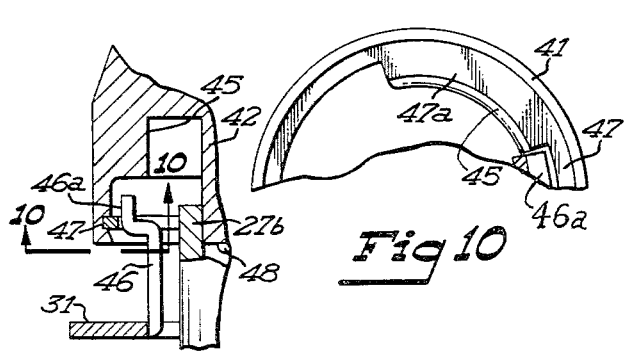
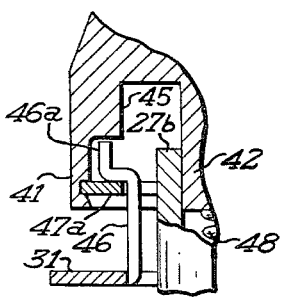
Fig 9    Fig 10    Fig 11
INVENTOR.
WALTER F. ALLINGHAM
BY
ATTORNEY United States Patent Office 3,236,252
Patented Feb. 22, 1966

3,236,252
MANIFOLD GAS VALVE
Walter F. Allingham, Torrance, Calif., assignor to
Honeywell Inc., a corporation of Delaware
Filed May 24, 1962, Ser. No. 197,340
2 Claims. (Cl. 137—66)

This application is concerned with improvements in a manifold gas valve and, more particularly, in the manual actuating mechanism for a rotary plug valve and the resetting mechanism for a thermocouple safety valve portion of the manifold valve.

As the space available for manifold valves of this type continues to become smaller and smaller, the heating controls industry is constantly striving to make manifold valves of this type more compact, to provide more control functions, less costly to manufacture and to provide reliable and safe operation by those operating the valve.

It is one of the objects of this invention to meet all of the above mentioned requirements in a single manifold valve.

Another object of the invention is to provide a manifold valve wherein the safety pilot portion thereof has manual means for turning off the flow of all gas, providing gas flow only to a pilot burner, providing a minimum flow rate through a separate passage having a flow rate adjustment therein, and providing a high rate of flow through a different passageway for a full flow of gas.

Another object of the invention is to provide a safety interlock mechanism between the valve body and the control knob wherein an abutment member on the valve body cooperates with separate abutment means on the control knob to permit safety reset of the safety valve only in the "pilot" position thereof and to prevent accidental turning of the knob between the "pilot" and "off" positions and to prevent accidental turning of the knob past the "high" position of the valve to the "low" position thereof in the starting operation of the valve.

Figure 1:
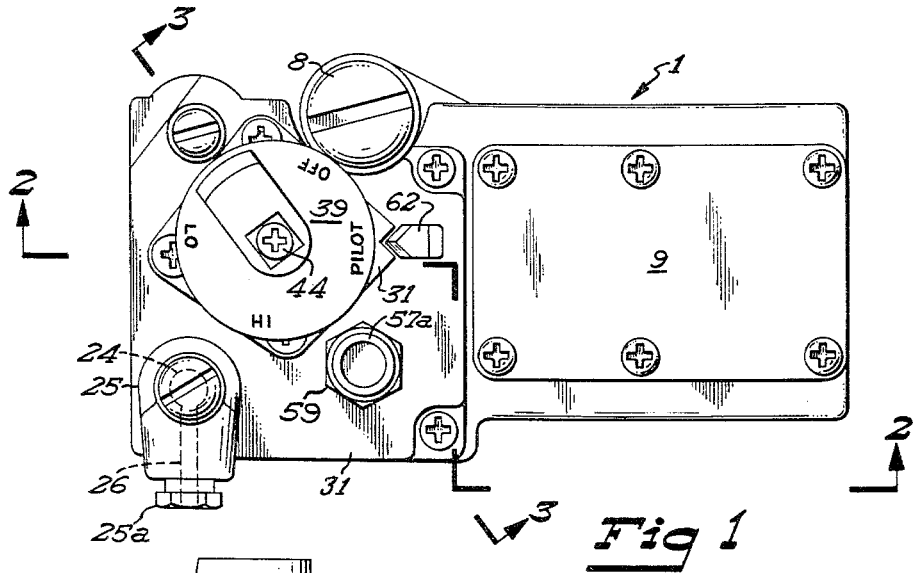
Figure 2:
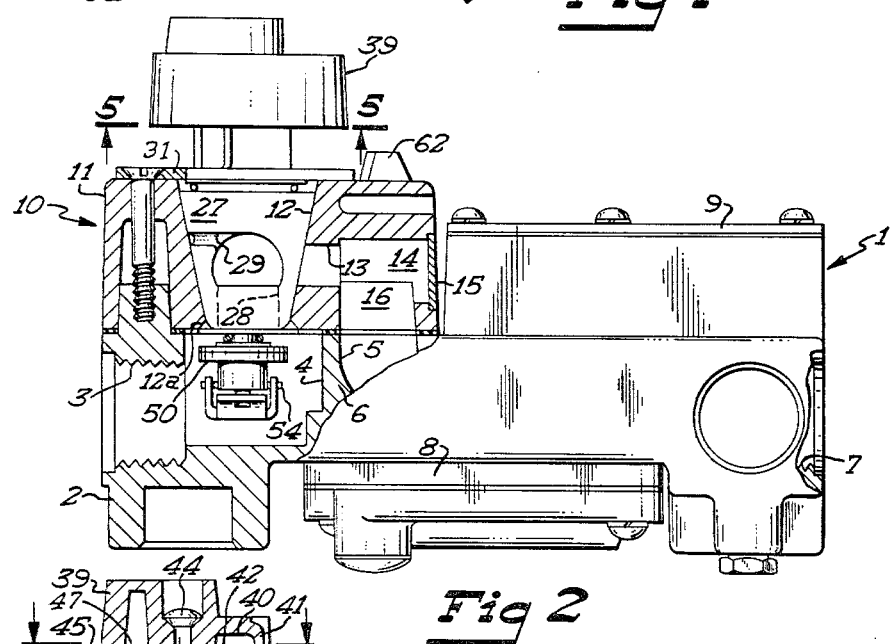
Figure 3:
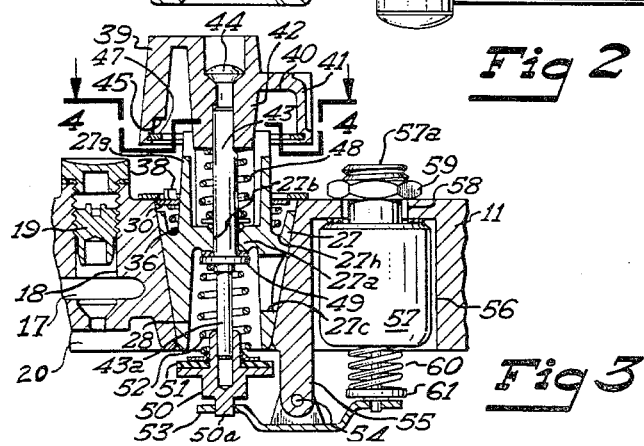
Figure 12:
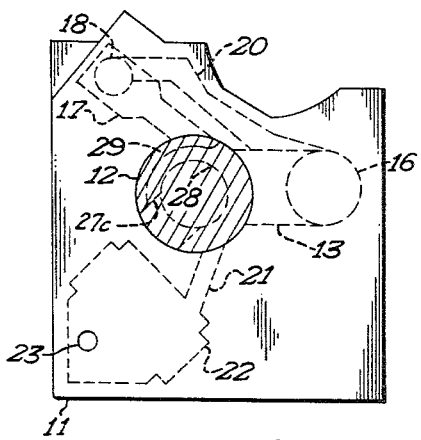
Figure 13:
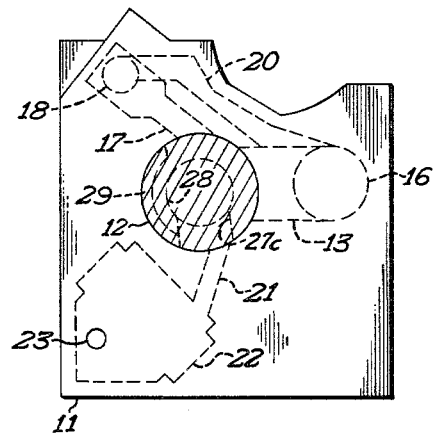
Figure 14:
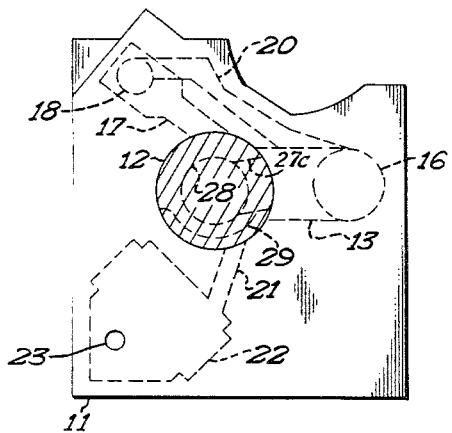
Figure 15:
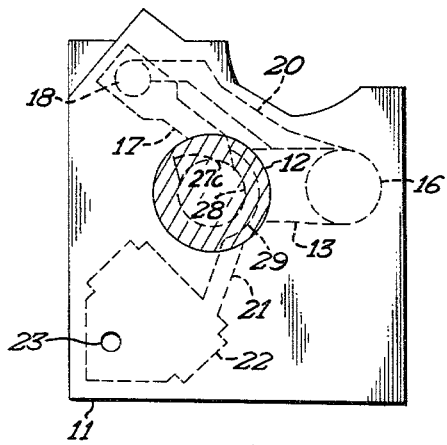

These and other objects of the invention will become apparent upon reading the following detailed description of the invention in conjunction with the accompanying drawing wherein:

FIGURE 1 is a plan view of the manifold valve;
FIGURE 2 is a side-elevational view of the manifold valve with portions thereof broken away;
FIGURE 3 is a cross-sectional view of a portion of the safety pilot portion of the manifold valve, taken along line 3—3 of FIGURE 1;
FIGURE 4 is a fragmentary cross-sectional view taken along line 4—4 of FIGURE 3;
FIGURE 5 is a bottom view of the control knob taken along line 5—5 of FIGURE 2;
FIGURE 6 is a sectional view through the control knob when the valve is in its "off" position;
FIGURE 7 is a fragmentary sectional view of the control knob when the valve is in its "pilot" position;
FIGURE 8 is a fragmentary bottom view of the control knob in the "pilot" position;
FIGURE 9 is a fragmentary sectional view of the control knob when it is in its "high" position;
FIGURE 10 is a fragmentary bottom view of the control knob in the "high" position thereof;
FIGURE 11 is a fragmentary sectional view of the control knob when the valve is in the "low" position;
FIGURE 12 is a plan view of the housing of the safety pilot portion of the manifold valve, with the knob and stop therefor removed, showing the plug valve and gas passage arrangement when the valve is in its "off" position;

FIGURE 13 is a similar view to FIGURE 12 but showing the plug valve in its "pilot" position;
FIGURE 14 is also a view similar to FIGURE 12 but showing the plug valve in its "high" position; and
FIGURE 15 is a view similar to FIGURE 12 showing the plug valve in its "low" position.

The entire manifold valve is generally designated by the reference numeral 1. The major body portion of the manifold valve is designated by the reference numeral 2 and has a threaded inlet 3 that communicates with an inlet passageway or recess 4, a second recess or passageway 5 with a thin dividing wall 6 therebetween, and a threaded outlet 7 at the extreme righthand end of the manifold valve.

Mounted on the valve body 2 is a pressure regulator 8 which regulates the pressure of gas passing from passageway 5 to the outlet 7. As the pressure regulator forms no part of this invention, other than being a part of the manifold valve, it will suffice to state that the outlet from the pressure regulator communicates with other passages (not shown), that are adapted to have inserted therein a thermostatically controlled valve (not shown), that may be added to the valve body 2 by substitution thereof for the removable cover 9 over that portion of the manifold valve.

The portion of the manifold valve with which this invention is primarily concerned, is the manually operable rotary plug valve and the thermocouple energized safety valve subassembly generally designated by the reference numeral 10. It comprises a casting 11 having a conical bore 12 therein with the lower and smaller diameter end portion terminating in an outwardly flared opening 12a at the lower surface of the casting and adapted to register with the inlet passage 4. Extending from this conical bore 12, is a horizontal passageway 13 that terminates in a bore 14, sealed at its outer end by a Welch plug 15, and a vertically extending bore 16 which extends from the bore 14 to the bottom of the housing 11 in alignment with the recess 5 in the main manifold valve body. Another passageway 17 extends horizontally from the bore 12 to a vertically extending bore 18 controlled by a manually adjustable valve 19 screw-threaded therein. A passageway 20 extends from the bore 18 to the bore 13 to provide a second gas flow passageway from the inlet passageway 4 through the bore 12 to the outlet 16. A third passageway 21 extends horizontally from the bore 12 to a filter chamber 22. The top of the filter chamber has a bore 23 therethrough which communicates with a bore 24 in a pilot outlet elbow 25 which is mounted on the casting 11. The elbow has an adjustable valve (not shown) similar to the valve 19 for regulating the rate of gas flow to the outlet fitting 25a.

Positioned in the conical bore 12, is a rotary plug valve 27 having a vertically extending bore 28 therein which extends from the bottom thereof to a point near the top thereof to provide a wall portion 27a, through which an axial bore 27b extends. A radially extending opening 27c through a side wall of the plug valve is adapted to register with the bores 13, 17 and 21 by proper rotation thereof. An arcuate groove 29 in the plug valve extends around the periphery thereof from the opening 27c to a point almost diametrically opposite the opening 27c so that the groove will register with the bore 21 in the "high" and "low" positions of the plug valve. The plug valve 27 has an upwardly extending collar portion 27g that passes through a washer 30. The washer 30 has a spline and groove connection with the collar 27g to permit relative axial movement therebetween. A retaining plate 31 has an opening 32 in the center thereof providing a marginal portion which overlies the washer 30 and is screw threaded to the top of the casting 11 by means of screws 33, 34 and 35. A coil compression spring 36 extends between the washer 30 and the bottom of an annular groove 27h at the base of the collar portion 27b, to resiliently bias the plug valve into seating engagement with the conical bore 12.

The plate 31 has an inwardly extending portion forming abutment shoulders 37 and 37a to be engaged by an inwardly and upwardly extending abutment arm 38 on the washer 30 to stop the valve in the "off" and "low" positions, of the valve.

The plug valve is adapted to be rotated by a knob 39 having an annular groove 40 in the bottom thereof providing a skirt portion 41 and a tubular portion 42, which fits on the upper end of a reset plunger or stem 43 extending through the bore 27b in the top of the plug valve. The portion 42 has a boss on the inner wall thereof adapted to engage a flattened portion at the upper end of the plunger 43 to prevent rotary movement between the knob and the plunger 43. A screw 44 holds the knob on the plunger 43. Ribs 42a and 42b on the tubular portion are axially slideable in grooves 27e and 27f formed in the inner wall of the sleeve extension of the plug valve. An arcuate pad 45 formed on the inner wall of the skirt portion 41 is adapted to cooperate with an offset upper end 46a of an upwardly extending arm 46, formed on the amount of axial movement of the knob with respect to the valve body when the plug valve is in its "high" and "low" positions, for a purpose to be presently described. A washer-shaped abutment member 47 having arcuate portions 47a and 47b, which are adapted to cooperate with the offset extensions 46a of the arm 46 to serve as stops for the knob when the valve is in its "high" position and in the "pilot" and "off" positions, respectively. However, by a slight axial movement of the knob toward the valve body, the washer 47 is positioned so that the upper surface thereof is below the lower surface of the transversely extending portion of the extension 46a so that with the knob slightly depressed, the knob may be rotated to move the arcuate portions under the arm 46a to position the valve in any one of its other selectable positions. The knob is normally biased outwardly with respect to the valve 27 by means of a coil compression spring 48, in which position the extension 46a would abut the ends of the arcuate ribs.

Positioned within the bore 28 of the plug valve, is a reduced diameter extension 43a of the stem 43 and an annular abutment shoulder 49, secured to the upper end thereof, which serves as means to limit the outward movement of the stem 43. Sealing washers are provided around the stem 43 below and above the wall 27a in a conventional manner. Cooperating with the lower end of the plug valve 27, as a valve seat, is a disk valve 50 having a sealing washer 51 thereon for engagement with the end of the plug valve. The disk valve has an axial bore therein which is slideable on the reduced diameter stem portion 43a and is resiliently biased away from the end of the plug valve by means of a coil compression spring 52. The disk valve has a stem 50a extending below the lower end thereof and through a hole in one end of a lever 53 pivoted intermediate its ends on a pivot 54. The pivot extends through a downwardly extending boss 55 formed on the lower side of the housing 11.

Positioned in an upwardly extending recess 56 in the underside of the housing 11, is a thermocouple energizable electromagnet and armature assembly 57 of conventional construction. The electromagnet assembly is retained in the housing 11 by having a connector terminal portion 57a thereof extending through an opening 58 in the housing, with a ring nut 59 threaded onto the terminal extension, all in a conventional manner. A coil compression spring 60 normally biases the lever 53, through abutment disk 61, in a clockwise direction to seat the disk valve against the end of the plug valve, but is illustrated in FIGURE 3 of the drawing as being in a compressed state, which would indicate that the electromagnet is energized and the armature (not shown) is held thereby to keep the valve 51 away from or out of seating engagement with the plug valve. When the electromagnet is not energized, the spring 60 has sufficient strength to pull the armature away from the electromagnet and to bias the valve disc 51 into seating engagement with the end of the plug valve, against the bias of spring 52.

*Operation*

Assuming that the manifold valve is connected to a source of gas supply, the outlet thereof connected to a main burner, the pilot outlet connected to a pilot burner and the electromagnet unit connected to a thermocouple heated by the pilot burner, the elements of the manifold valve, as illustrated in FIGURES 1 through 3, 7 and 8 and 13, are in their respective positions which provide for the flow of gas to a pilot burner and the pilot burner is burning causing the safety valve 51 to be held in its open position. This would be what would generally be called a standby or a summer shutdown condition, providing only a small amount of a heat to be generated in the furnace to help prevent the rusting thereof. If it is desirable to completely shut off the gas, all that is necessary is to slightly depress the knob to position the washer 47 below the arm extension 46a and then rotate the knob to the "off" position with the indicia "off" in alignment with a pointer 62 on the top of the housing 11. In this position of the valve, the opening 27c in the plug valve is not registering with any of the passages in the housing and the arcuate groove 29 is not in communication with the passage 21 leading to the pilot filter, it being understood that the arcuate groove 29 is axially spaced from the passageway 17 leading to the manually adjustable control valve for the low fuel rate of flow.

Should it be desired to place the burner in full operation rather than turn the gas completely off, the knob may be rotated without being depressed from the pilot position, as illustrated, to the high position with the indicia "hi" in alignment with the pointer 62, at which position the arm 46a is in abutment with one end of the arcuate rib 47a, as illustrated in FIGURE 10 of the drawing. In this position, the opening 27c in the plug valve is in alignment with the opening 13 in the housing to provide full gas flow to the manifold valve.

Should it be desired to merely place the system in a condition to provide only a low or partial feeding rate, it will be necessary to slightly depress the knob to again position the washer 47 below the extension 46a and then rotate the knob past the "high" position to the "low" position, with the indicia "lo" positioned in alignment with the pointer 62. In this position, the arm extension 46a rests on the rib 47a and the stop 38 bears against shoulder 37a. In this position of the plug valve, the opening 27c registers with the passage 17 so that all gas flowing to the main burner will have to flow past the adjustment valve 19 which restricts the flow of gas to the desired amount to provide a low flame or low capacity heating. This condition of the valve and flow passages is illustrated in FIGURE 15 of the drawing. It is to be noted that in each of the "high" and "low" positions of the plug valve, gas is supplied from the plug valve to the pilot burner through the filter chamber by having the gas flow through the arcuate groove 29 in the surface of the plug valve to the passage 21.

Should the pilot flame become extinguished, causing the thermocouple to cool down and stop producing electric current to energize the electromagnet, the coil spring 60 bearing against abutment disk 61 which, in turn, bears against the end of lever 53, will rotate the lever 53 to force the valve disk 51 into seating engagement with the end of the plug valve, against the bias of spring 52, and shut off the flow of gas to the main burner as well as to the pilot burner. As the arcuate pad 45 is positioned over the upper end of the arm extension 46a in both the "high" and "low" positions of the plug valve, it would be impossible to depress the knob 39 in these positions to reset the safety valve and this prevents any accidental explosion that may result from supplying gas to the furnace while there is still a possibility that an unsafe condition is in existence. In order to place the system in operation following a safety shutdown, a period of time should be allowed for unburned gases to be exhausted from the furnace before initiating a starting operation. To again supply gas to the furnace, the knob must be rotated to the "pilot" position which removes the arcuate pad 45 from above the arm 46a to free the knob for substantial axial movement with respect to the plug valve and to bring the lower end of the stem 43a into engagement with the bottom of the valve 50 and to pivot lever 53 to open the valve 51 and reset the armature against the magnet in the electromagnet unit 57. This opening of the valve 51 permits gas to flow only to the pilot burner which may then be ignited by suitable means. Following a sufficient time to enable the thermocouple to be heated sufficiently to generate current to hold the armature against an electromagnet, the knob may be released to be returned to its outward position under the bias of spring 48. If the electromagnet is sufficiently energized indicating that the pilot burner is providing a flame for heating the thermocouple and igniting the main burner, the plug valve may be rotated to either the "high" or "low" positions to place the burner in operation at the desired heating level.

From the above description of the invention, it is readily seen that a very compact valve subassembly is provided that can be readily attached to a valve body in an extremely simple and inexpensive manner. It is also to be noted that a single stop arm mounted on the valve subassembly serves a dual function of cooperating with one abutment means on a control knob to prevent axial movement of the knob for resetting purposes and cooperates with another abutment means on the control knob for preventing accidental or unintentional rotary movement of the plug valve between its various operating positions. It is also to be noted that the arrangement disclosed above provides for accurate selecting of the rate of fuel flow between a high rate of flow and a preselected lower rate of flow which makes it possible for a homeowner to make the change without having to call in a skilled serviceman to make the change.

As it is deemed to be obvious that modifications may be made in the invention without departing from the spirit thereof, the scope of the invention should be determined from the appended claims.

I claim as my invention:

1. In a manifold valve, the combination comprising a valve body having an inlet and a main outlet and a pilot outlet; a rotary valve having a coaxial inlet and a radial outlet and being movable between "off," "pilot," "high" and "low" positions; a manually resettable safety valve positioned between said body inlet and said rotary valve inlet and arranged to seat over the coaxial inlet; a first passageway leading from said body inlet to said safety valve; a second passageway leading from said rotary valve to said main outlet; a third passageway leading from said rotary valve to said main outlet; an adjustable valve in said third passageway; a fourth passageway leading from said rotary valve to said pilot outlet, said fourth passageway being located so as to be in registration with the outlet of said rotary valve in the "pilot," "high" and "low" positions thereof; said outlet of said rotary valve being selectively registerable with said second and third passageways at the "high" and "low" positions of the rotary valve; a knob axially slidable on and non-rotatably connected to said rotary valve and biased away from said rotary valve; an abutment member on said valve body and extending toward said knob, said abutment member having a transversely extending arm; said knob having first abutment means thereon arranged to cooperate with said transversely extending arm and shaped to provide for only slight axial movement of said knob in the "high" and "low" positions thereof but to provide for substantial axial movement thereof in the "pilot" position thereof; said knob also having second abutment means thereon arranged to cooperate with said transversely extending arm to provide for free rotation of the knob between "high" and "pilot" positions but requiring slight axial movement of the knob to free the knob to move between the "off" and "pilot" positions and to move from the "high" position to the "low" position; said knob having means associated therewith that is axially slidable through said rotary valve to engage and reset said safety valve when the rotary valve is in its "pilot" position and the knob is moved axially, said slight movement of said knob in the "high" and "low" positions being insufficient to reset the safety valve.

2. The combination defined in claim 1, wherein said valves and the manually operable means therefor are all embodied in a subassembly attachable to a manifold valve body.

References Cited by the Examiner
UNITED STATES PATENTS

| | | | |
|---|---|---|---|
| 2,318,823 | 5/1943 | Wantz | 137—66 |
| 2,353,759 | 7/1944 | Ray | 158—131 X |
| 2,655,177 | 10/1953 | Ryon | 137—625.12 |
| 2,746,472 | 5/1956 | Sogge | 158—131 X |
| 2,881,779 | 4/1959 | Meusy | 137—66 |

FOREIGN PATENTS 771,524  4/1957  Great Britain.

ISADOR WEIL, *Primary Examiner.*

J. DEATON, R. GERARD, *Assistant Examiners.*